R. P. BROWN, C. P. FREY AND F. WAGNER.
SCALE MECHANISM FOR ELECTRICAL MEASURING INSTRUMENTS.
APPLICATION FILED MAR. 4, 1919.

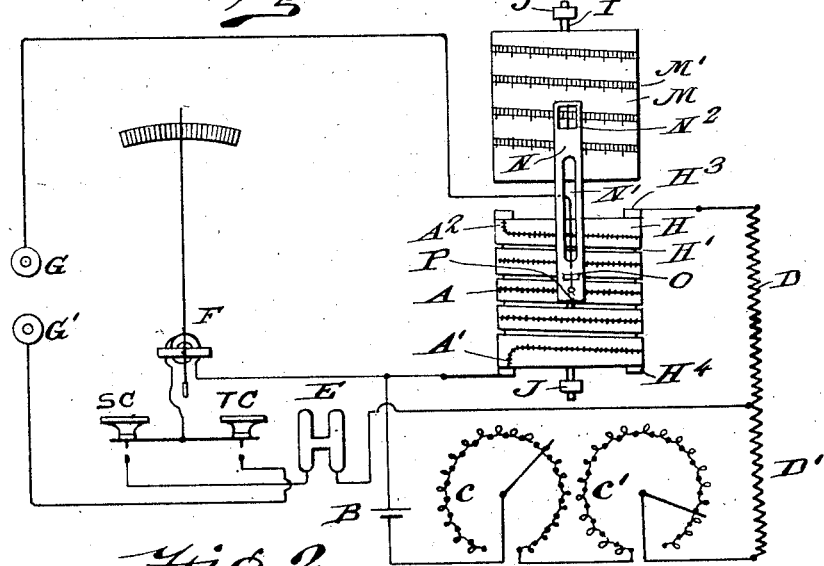
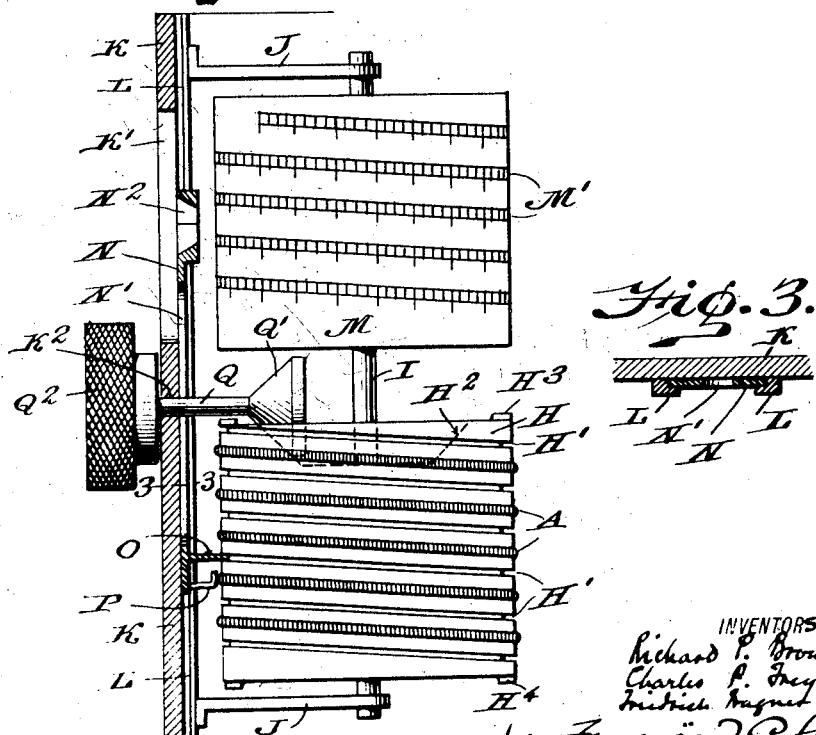

1,320,120.

Patented Oct. 28, 1919.
2 SHEETS—SHEET 2.

INVENTORS
Richard P. Brown
Charles P. Frey
Friedrich Wagner
by Francis J. Chambers
their ATTORNEY

UNITED STATES PATENT OFFICE.

RICHARD P. BROWN, CHARLES P. FREY, AND FRIEDRICH WAGNER, OF PHILADELPHIA, PENNSYLVANIA, ASSIGNORS TO THE BROWN INSTRUMENT COMPANY, OF PHILADELPHIA, PENNSYLVANIA, A CORPORATION OF PENNSYLVANIA.

SCALE MECHANISM FOR ELECTRICAL MEASURING INSTRUMENTS.

1,320,120.

Specification of Letters Patent.

Patented Oct. 28, 1919.

Application filed March 4, 1919. Serial No. 280,530.

*To all whom it may concern:*

Be it known that we, RICHARD P. BROWN, CHARLES P. FREY, and FRIEDRICH WAGNER, citizens of the United States of America, and residents of the city and county of Philadelphia, in the State of Pennsylvania, have invented certain new and useful Improvements in Scale Mechanism for Electrical Measuring Instruments, of which the following is a true and exact description, reference being had to the accompanying drawings, which form a part thereof.

Our invention relates to scale mechanism for electrical measuring instruments involving a rheostat consisting of a resistance wire and a movable element for determining the potential between two points on said wire. Primarily our invention is designed for use in connection with the rheostat in the form of what is called the slide wire in instruments known as potentiometers.

The object of our invention is to provide and make practicable the use of a long scale occupying a small and compact space in connection with such instruments, and broadly speaking, our invention consists in providing the instrument with a cylindrical rotating supporting base for the slide wire on which the slide wire, coiled around the cylinder in the form of a spiral, is secured, in providing further a rotating scale supporting cylinder, rotating synchronously with and actually or in effect forming an extension of, or a part of, the wire supporting cylinder, on which is formed a spiral scale corresponding in pitch to the spiral windings of the resistance wire, and in providing an index movable over the scale in a line parallel to the axes of the cylinders and actuated synchronously with the rotative movements of the cylinders. By preference the index is carried by a slide actuated by a spiral guideway on the wire carrying cylinder and carries a movable element movable in contact with the resistance wire for determining, in connection with the ordinary elements of a potentiometer, the potential between two points on the resistance wire.

The nature of our invention will be best understood as described in connection with the drawings in which—

Figure 1 is a diagrammatic showing of the potentiometer as a whole, showing also in front elevation our new wire and scale carrying cylinders and the slide carrying the index and wire contacting slide.

Fig. 2 is a side elevation taken in section through the face plate of a casing containing the instrument and the index slide, and showing a simple device for rotating the cylinder.

Fig. 3 is a cross section on the line 3—3 of Fig. 2, and

Figure 4:
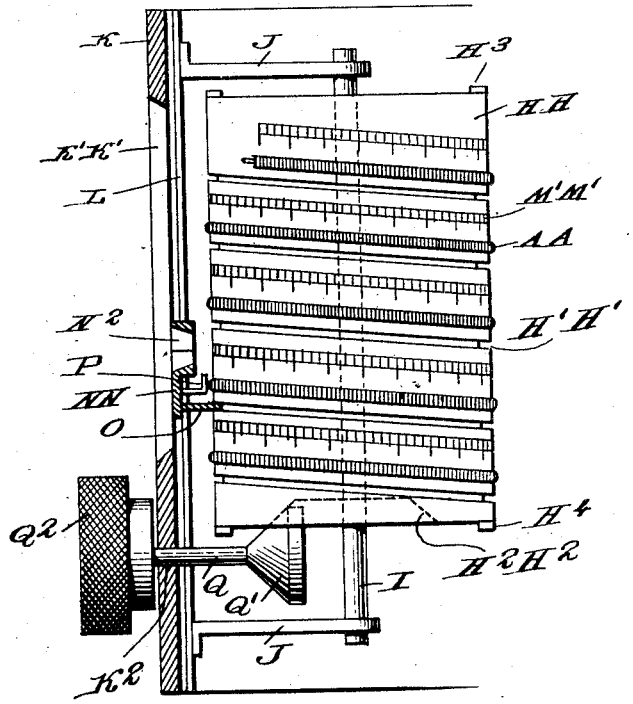
Fig. 4 is a view similar to Fig. 2, showing a modification.

Referring first to the diagrammatic view, Fig. 1, A indicates the slide wire of the potentiometer which is coiled in the form of a spiral on a cylinder H. A′ and A² indicate the ends of the wire, which, as is usual, is spirally wound on a core and insulated except on the front or exposed side where the sliding contacting element P moves over it. B is the usual small dry cell, current from which is continuously passing over the slide wire from A′ to A². The ordinary resistors are indicated at D and D′, and the ordinary rheostats at C and C′. E indicates a standard cell, the + side of which is connected through the standard cell key SC with a galvanometer F, and the zero end A′ of the slide wire. G and G′ are the binding posts to which the source of potential to be tested are connected in circuit through the key TC and the sliding element P, which is movable over the slide wire and by moving which the E. M. F. of the source of potential is determined.

In all the indicated and described features, except as to the scale and index mechanism shown in connection with the diagram, the diagram illustrates an old and familiar construction.

Referring now to the details of our apparatus, H is a cylinder having coiled around it in a spiral the slide wire A, the ends A′ and A² of which connect with contact rings H³ and H⁴ on the ends of the cylinder. Also running spirally around the cylinder H is a guideway shown as a groove H′, and, as shown, a conical friction surface H² is formed at one end of the cylinder, as shown, at its top. The cylinder H is secured to a rotatable shaft I journaled at the top and bottom in arms J, J, secured to the face plate K of the instrument. This face plate is formed with a sight opening K′ and a bearing K² for the shaft Q, and it supports guideways L, L, running parallel to the axis of the cylinder in which guideways moves the index slide N, carrying the index N², and slotted at N' to give passage to shaft Q. The index slide carries a finger O, which enters the guideway slot H' and by which the slide is moved, and also the sliding contact member P, which is connected in circuit as shown in Fig. 1.

M is a scale bearing cylinder secured on shaft I, and in effect forming a prolongation of cylinder H, and on it is formed the scale M', which is spiral in form, and corresponds in pitch with the spirally wound slide wire.

The shaft Q, already mentioned, carries the friction cone Q' which engages the conical friction cone H² on cylinder H, and by which the cylinders are rotated by means of the hand wheel Q.

In operation the slide P is moved over the slide wire by rotating the cylinder H by means of the hand wheel Q², shaft Q, and friction cone Q'. The rotation of the cylinder by means of its guideway H' and the finger O, moves the slide N parallel to the axis of the cylinder at such a rate as to keep the slider in constant contact with the rotating spiral wire. The cylinder M revolves with cylinder H, and the spiral scale M', having the same pitch as the spiral slide wire, is always in register with the index N² on the slide N, so that the index always shows on the scale, the point corresponding to the point on the slide wire with which the slider P is in contact.

In the modification of Fig. 4 the cylinder HH takes the place of the cylinders H and M, the slide wire AA is wound on it with a somewhat greater pitch, which, of course, is followed by the guideway H'H', and the scale M'M' is formed between the convolutions of the slide wire as shown. The friction cone H²H² is formed at the end of the cylinder and a short index slide NN takes the place of the slide N, and the opening K'K' is changed in location to conform to the location of the scale. This modification has the obvious advantage that it permits a longer wire and scale to be used for the same vertical heights.

Having now described our invention, what we claim as new and desire to secure by Letters Patent, is:

1. In an electrical measuring instrument a rotatable cylindrical support, in combination with a rheostat consisting of a resistance wire wound in the form of a spiral on said cylindrical support, a spiral scale also formed on and moving with the cylindrical support, an index movable in a line parallel to the cylinder axis, and means actuated by the movements of the cylinder for moving the index over the scale.

2. In an electrical measuring instrument a rotatable cylindrical support, in combination with a rheostat consisting of a resistance wire wound in the form of a spiral on said cylindrical support, a movable element for determining the potential between two points on the resistance wire, a spiral scale also formed on and moving with the cylindrical support, an index movable in a line parallel to the cylinder axis, and means actuated by the movements of the cylinder for moving the index over the scale.

3. In an electrical measuring instrument a rotatable cylindrical support, in combination with a rheostat consisting of a resistance wire wound in the form of a spiral on said cylindrical support, a spiral scale also formed on and moving with the cylindrical support, an index movable in a line parallel to the cylinder axis, and means actuated by the movements of the cylinder for moving the index over the scale in a coördinate relation to the movements of the movable element over the resistance wire.

RICHARD P. BROWN.
CHARLES P. FREY.
FRIEDRICH WAGNER.